(12) United States Patent  
Min

(10) Patent No.: US 7,869,824 B2  
(45) Date of Patent: Jan. 11, 2011

(54) CELL PHONE WITH REMOTE CONTROL SYSTEM

(76) Inventor: Byung Woo Min, 8334 Foothill Blvd., Sunland, CA (US) 91040

( * ) Notice: Subject to any disclaimer, the term of this patent is extended or adjusted under 35 U.S.C. 154(b) by 175 days.

(21) Appl. No.: 11/516,335

(22) Filed: Sep. 6, 2006

(65) Prior Publication Data

US 2008/0057929 A1 Mar. 6, 2008

(51) Int. Cl.
*H04M 1/00* (2006.01)
(52) U.S. Cl. .............. 455/550.1; 455/552.1; 455/556.1; 455/418; 455/419; 455/420
(58) Field of Classification Search ......... 455/418–420, 455/79, 557, 575, 66, 151.1, 151.4, 352, 455/353, 556, 550.1, 552.1, 556.1, 556.2; 370/465, 514, 486, 343; 340/825.57, 825.69, 340/825.72; 348/552, 6, 10, 16
See application file for complete search history.

(56) References Cited

U.S. PATENT DOCUMENTS

| | | | | |
|---|---|---|---|---|
| 5,201,007 A | * | 4/1993 | Ward et al. | 381/328 |
| 5,426,689 A | * | 6/1995 | Griffith et al. | 455/575.2 |
| 5,465,401 A | * | 11/1995 | Thompson | 455/558 |
| 5,630,206 A | * | 5/1997 | Urban et al. | 455/456.1 |
| 5,671,267 A | * | 9/1997 | August et al. | 455/420 |
| 6,223,029 B1 | * | 4/2001 | Stenman et al. | 455/420 |
| 6,396,612 B1 | * | 5/2002 | Bjorndahl | 398/121 |
| 6,628,964 B1 | * | 9/2003 | Bates et al. | 455/556.1 |
| 6,901,241 B2 | * | 5/2005 | Bjorndahl | 455/41.2 |
| 6,924,727 B2 | * | 8/2005 | Nagaoka et al. | 340/3.1 |
| 7,424,733 B2 | * | 9/2008 | Kamiwada et al. | 726/4 |
| 7,617,009 B2 | * | 11/2009 | Hirose et al. | 700/17 |
| 7,630,724 B2 | * | 12/2009 | Beyer et al. | 455/457 |
| 7,786,991 B2 | * | 8/2010 | Reshetov et al. | 345/420 |
| 2004/0204038 A1 | * | 10/2004 | Suzuki et al. | 455/553.1 |
| 2005/0054337 A1 | * | 3/2005 | Nobusawa et al. | 455/420 |
| 2008/0001773 A1 | * | 1/2008 | Rye et al. | 340/825.22 |

* cited by examiner

*Primary Examiner*—Kamran Afshar
*Assistant Examiner*—Babar Sarwar
(74) *Attorney, Agent, or Firm*—John K. Park; Park Law Firm

(57) ABSTRACT

A remote control system includes a mobile phone, a mobile communication network, a plurality of remote systems, and a server. The mobile phone has an antenna, a mobile communication modem, a processing unit, a system memory, a battery, a keypad, a speaker, and a display The mobile communication network comprises a wireless communication network. The remote systems communicate electronic signals with the mobile phone via the mobile communication network. And, the server is connected to the mobile communication network. The mobile phone controls the behavior of the remote system and communicates electronic signals for data, audio, and video with the processing unit having control software programs. The mobile phone decodes the electronic signals and plays on the display and the speaker. The remote mobile phone downloads and installs the control software programs from the server through the mobile communication network.

22 Claims, 7 Drawing Sheets

CELL PHONE WITH REMOTE CONTROL SYSTEM

BACKGROUND OF THE INVENTION

The present invention relates to a remote control system using a mobile phone including a cell phone and a PDF phone.

More particularly, this invention relates to a remote control system using a mobile phone, which monitors and controls the behavior of remote systems including a remote vehicle control system, a remote vehicle alarm starter, a remote vehicle starter, a remote vehicle alarm, a home automation system, a home control system, and a home security system.

Mobile phone becomes an indispensable personal item in our modern techno society. Almost everybody has its own mobile phone of one type or another.

This ubiquity of the mobile phone provides a good housing slot among the already crowded personal space for terminals for the remote vehicle control system and the home security system: the ubiquity of the mobile phone meets another ubiquity of the car and the house.

The inherent function of the mobile phone makes it convenient to use and maintain the remote systems.

Accordingly, a need for a remote control system using a mobile phone has been present for a long time considering the ubiquity of the mobile phone, the car, and the house. This invention is directed to solve these problems and satisfy the long-felt need.

SUMMARY OF THE INVENTION

The present invention contrives to solve the disadvantages of the prior art.

An objective of the invention is to provide a remote control system using a mobile phone.

Another object of the invention is to provide a remote control system using a mobile phone, which monitors and controls the remote systems including a remote vehicle control system, a remote vehicle alarm starter, a remote vehicle starter, a remote vehicle alarm, a home automation system, a home control system, and a home security system.

Still another object of the invention is to provide a remote control system using a mobile phone, which downloads and upgrades the control software programs and system software including feature programs and firmware from a server using a mobile communication network or a local RF communication.

Still other object of the invention is to provide a remote control system using a mobile phone, which uses an RF communication unit to communicate with the remote system directly.

For the purposes, a remote control system includes a mobile phone, a mobile communication network, a plurality of remote systems, and a server.

The mobile phone has an antenna, a mobile communication modem, a processing unit, a system memory, a battery, a keypad, a speaker, and a display The mobile communication network comprises a wireless communication network. The remote systems communicate electronic signals with the mobile phone via the mobile communication network. And, the server is connected to the mobile communication network.

The mobile phone controls the behavior of the remote system and communicates electronic signals for data, audio, and video with the processing unit having control software programs. The mobile phone decodes the electronic signals and plays on the display and the speaker. The remote mobile phone downloads and installs the control software programs from the server through the mobile communication network.

The remote systems include a remote vehicle control system, a remote vehicle alarm starter, a remote vehicle starter, a remote vehicle alarm, a home automation system, a home control system, and a home security system. The remote systems are selected using graphic icons, command words, or graphic icons and command words on the display and key combinations on the keypad.

The control software programs controls a plurality of behaviors of the remote system. The behaviors of the remote system include locking, unlocking, arming, disarming, opening trunk, engine starting, engine disabling, surveillance camera starting, panic mode starting, opening or closing of window, seat memory controlling, and opening or closing of sunroof of the vehicle.

The behavior of the remote system includes behaviors of gate, garages, doors, lights, surveillance cameras, gas valves, and ovens. The behavior of the remote system further includes arming and disarming of the home security system.

The control software programs monitor a plurality of statuses of the remote system. Also, the control software programs perform a plurality of diagnosis checks.

The control software programs perform a plurality of program updates for the mobile phone and the remote systems, and the program updates comprise updating the control software programs including the feature programs and firmware by a user-initiated downloading and updating the control software programs by a server-initiated downloading.

The remote system includes an information processing unit, a memory, one or more data taking devices, one or more input devices, and one or more output devices. The data taking devices of the remote system includes a surveillance camera, and the mobile phone exchanges multimedia information and control signals with the remote system.

The mobile phone downloads an electronic map and a global positioning system information from the server through the mobile communication network or internet, and the mobile phone is adapted to work as a navigation system with a user of the mobile phone on board of the vehicle, wherein the mobile phone is adapted to work as a tracking system for the vehicle with the user of the mobile phone away from the vehicle.

The mobile phone further includes a programmable hot key for shortening a long combination of keys for a predetermined command.

The remote control system may further include a billing system for using the mobile communication system and the server, and the billing system is combined with a billing system of the mobile communication system.

The control software programs are downloaded and installed on the mobile phone through the mobile communication system.

The mobile phone further includes a power and data connector, and the control software programs are downloaded and installed on the mobile phone through the Internet with the power and data connector of the mobile phone.

The remote systems initiate a connection with the mobile phone. The remote systems include a surveillance camera, one or more alarm system, and one or more sensors. The remote system initiates communications with the mobile phone and issue a warning message, a warning light, a warning sound, or video clips from the remote systems on the display ad the speaker of the mobile phone.

The remote systems include an audio video recorder, wherein the mobile phone initiates communication with the remote systems to play an audio video information recorded in the audio video recorder.

In a second embodiment of the invention, a remote control system may include a mobile phone with an RF communication unit and a back-up battery.

The mobile phone communicates with the remote systems directly through the RF communication unit. The mobile phone further includes a mode button for toggle switching between RF mode and MCN (mobile communication network) mode, and the mobile phone further includes a key combination for emulating the mode button. The back-up battery powers the RF communication unit only when the main mobile phone battery is discharged. Also, the back-up battery is charged whenever the mobile phone is charged.

The RF communication unit may use an original RF module in the mobile communication modem of the mobile phone, and the mobile communication modem further comprise a frequency changer for changing the frequency of the original RF module.

Alternatively, the RF communication unit includes a customized RF module of its own.

The other features for the second embodiment with an RF communication unit are similar to the first embodiment.

The advantages of the present invention are: (1) the remote control system using a mobile phone monitors and controls the remote systems including a remote vehicle control system, a remote vehicle alarm starter, a remote vehicle starter, a remote vehicle alarm, a home automation system, a home control system, and a home security system; (2) the remote control system downloads and upgrades the control software programs from a server; and (3) the remote control system uses an RF communication unit to communicate with the remote system directly.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION OF THE INVENTION

Figure 1:
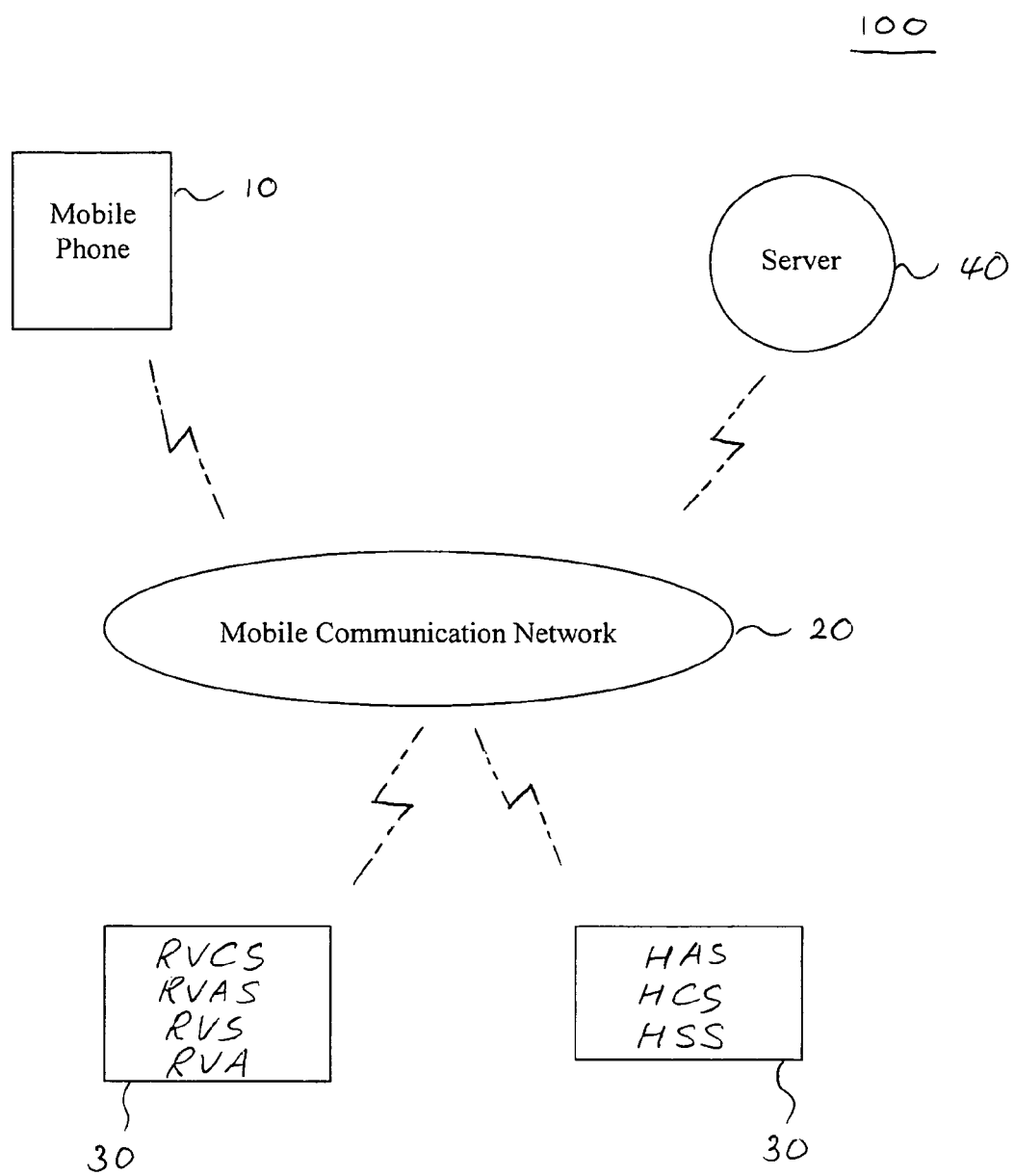
FIG. 1 is a schematic diagram showing a first embodiment of a remote control system according to the invention.

FIGS. 1 through 5 show a first embodiment of a remote control system 100 according to the invention.

The remote control system 100 includes a mobile phone 10, a mobile communication network 20, a plurality of remote systems 30, and a server 40.

Figure 2:
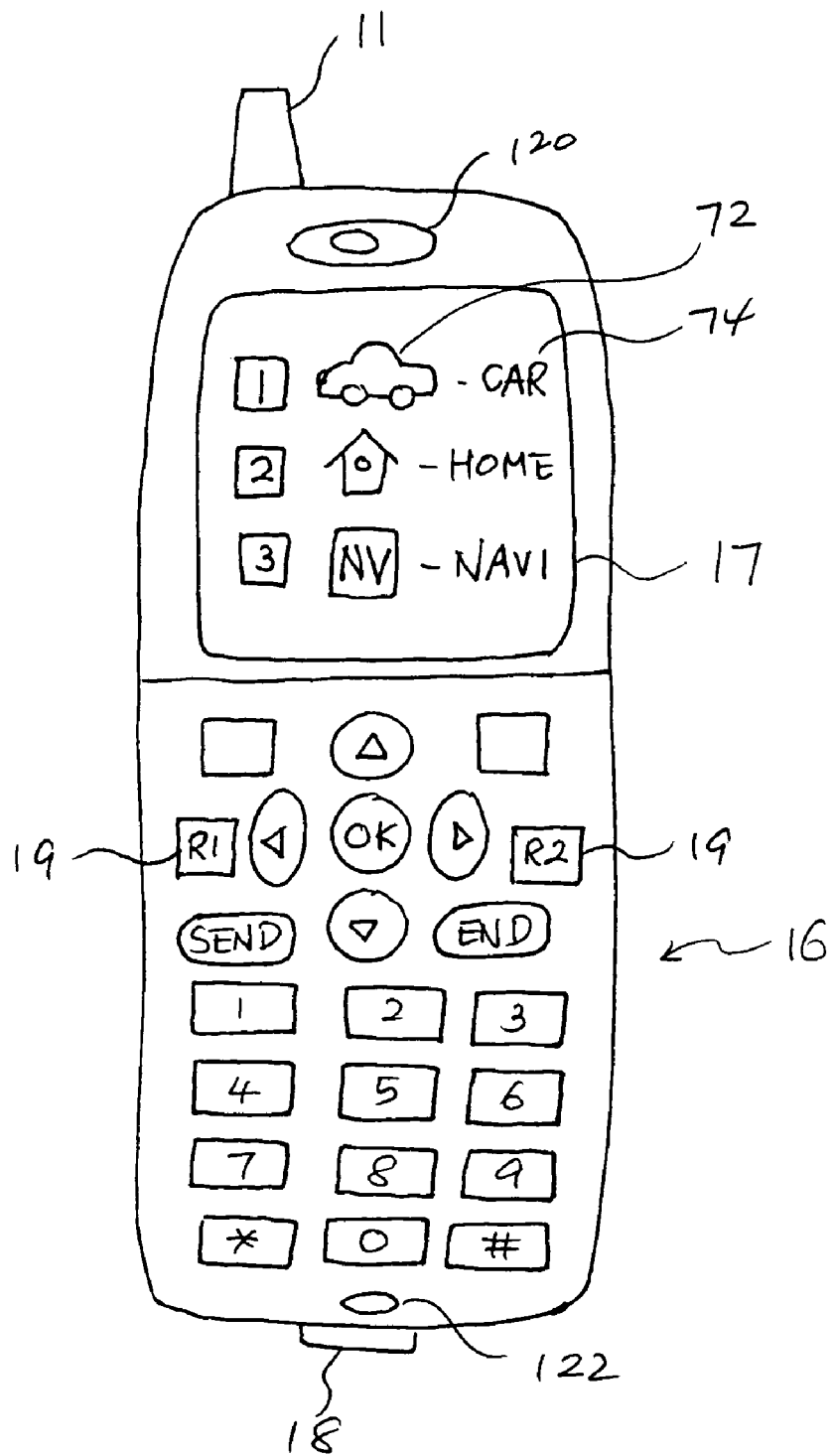
FIG. 2 is a front view of a mobile phone according to the invention.
Figure 5:
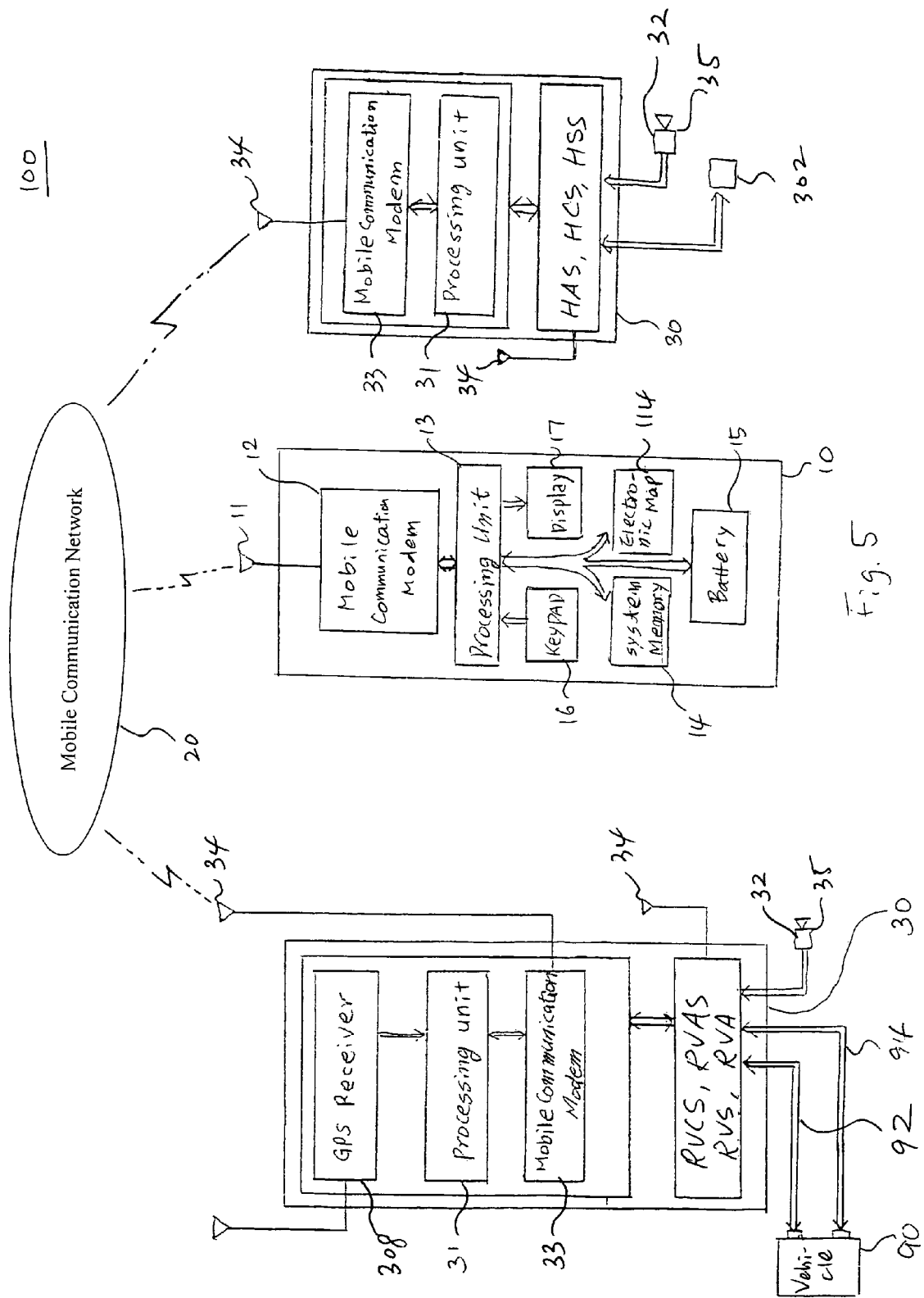
FIG. 5 is a perspective view of FIG. 1.

The mobile phone 10 has an antenna 11, a mobile communication modem 12, a processing unit 13, a system memory 14, a battery 15, a keypad 16, and a display 17 as shown in FIG. 2 and FIG. 5.

The mobile communication network 20 includes a wireless communication network. The remote systems 30 communicate electronic signals with the mobile phone 10 via the mobile communication network 20. And, the server 40 is connected to the mobile communication network 20.

The mobile phone 10 controls the behavior of the remote system 30 and communicates electronic signals for data, audio, and video with the processing unit 13 having control software programs. The mobile phone 10 decodes the electronic signals and plays on the display 17. The remote mobile phone 10 downloads and installs the control software programs from the server 40 through the mobile communication network 20.

The remote systems 30 include a remote vehicle control system (RVCS), a remote vehicle alarm starter (RVAS), a remote vehicle starter (RVS), a remote vehicle alarm (RVA), a home automation system (HAS), a home control system (HCS), and a home security system (HSS). The remote systems 30 are selected using graphic icons 72, command words 74, or graphic icons 72 and command words 74 on the display and key combinations on the keypad 16 as shown in FIG. 2, FIG. 3, and FIG. 4.

The control software programs controls a plurality of behaviors of the remote system 30 along with the behaviors of the mobile phone 10.

Figure 3:
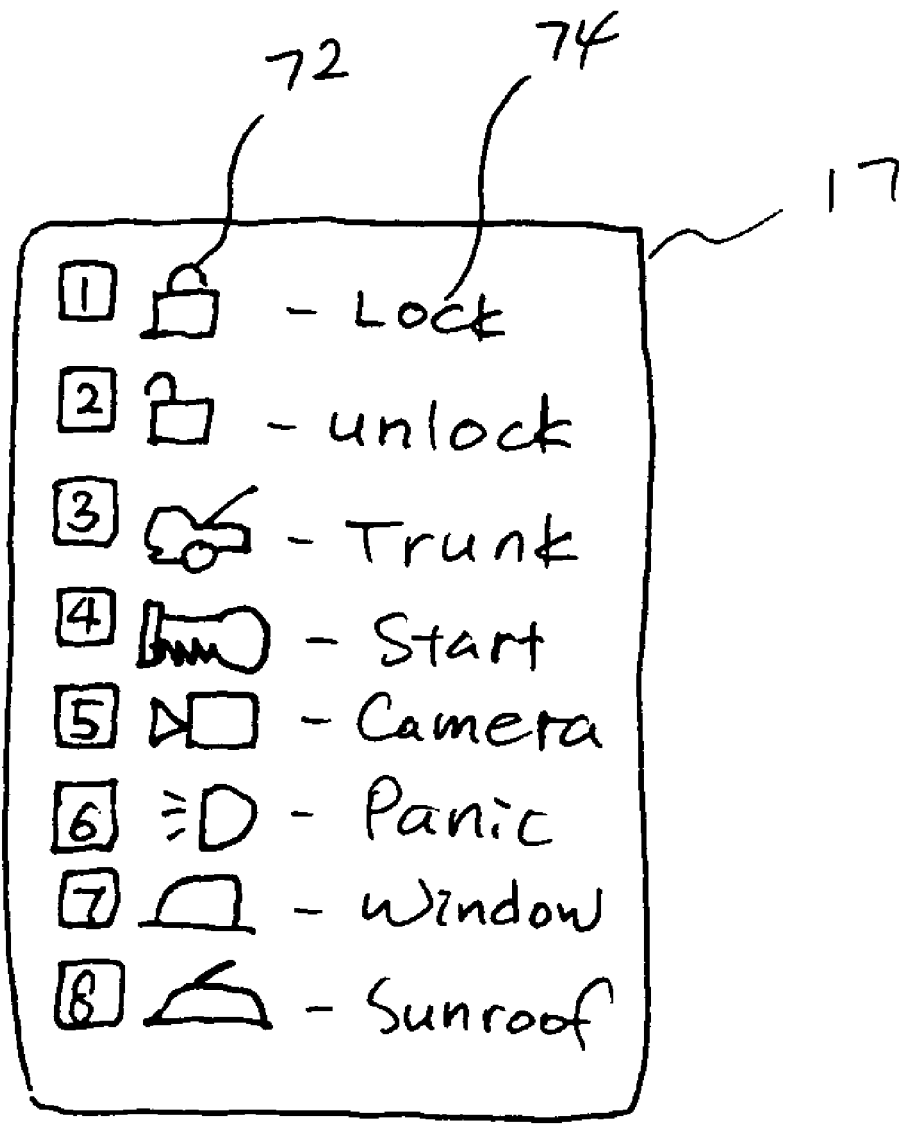
FIG. 3 is a schematic view of a display showing icons for a remote vehicle control system.
Figure 4:
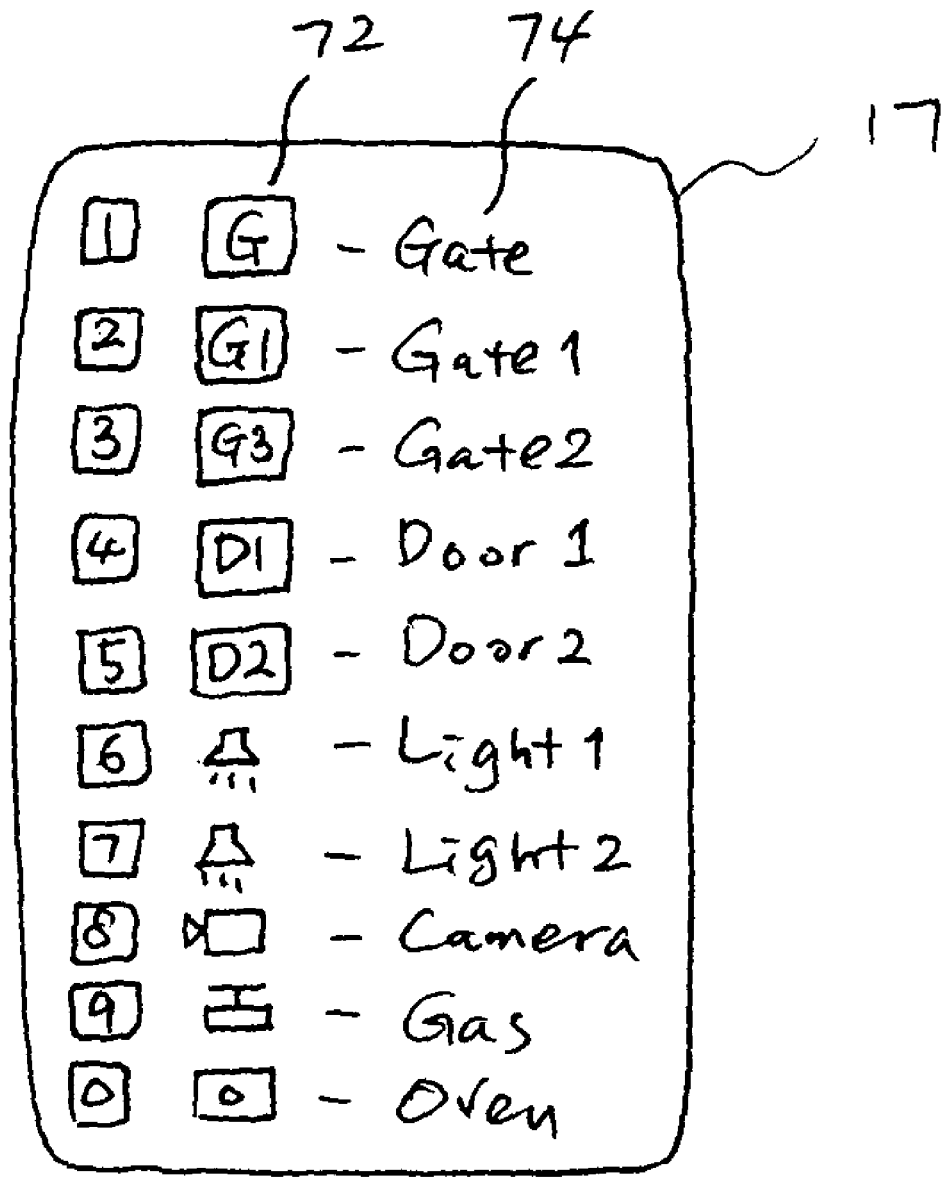
FIG. 4 is a schematic view of a display showing icons for a home security system.

The behaviors of the remote system 30 include locking, unlocking, arming, disarming, opening trunk, engine starting, engine disabling, surveillance camera starting, panic mode starting, opening or closing of window, seat memory controlling, and opening or closing of sunroof of the vehicle 90 as shown in FIG. 3 and FIG. 5.

The behaviors of the mobile phone 10 include the layout, size, order, and change of the graphics icons 72 and commands words 74.

The behavior of the remote system 30 includes behaviors of gate, garages, doors, lights, surveillance cameras, gas valves, and ovens as shown in FIG. 4. The behavior of the remote system 30 further includes arming and disarming, and controlling of one or more sensors (not shown) of the home automation system and the home security system as shown in FIG. 4 and FIG. 5.

The control software programs monitor a plurality of statuses of the remote system 30. Also, the control software programs perform a plurality of diagnosis checks and error checks of the remote system 30.

The control software programs perform a plurality of program updates, and the program updates include updating the feature programs, the firmware, and the control software programs by a user-initiated downloading and updating the control software programs by a server-initiated downloading. Also, the control software programs control the parameters governing the behaviors of the remote system 30 including an exit time setting of a parking lot door of the home security system.

The remote system 30 includes an information processing unit 31, a memory (not shown), one or more data taking devices 32, one or more input devices (not shown), one or more output devices (not shown), a mobile communication modem 33, and antenna 34. The data taking devices 32 of the remote system 30 includes a surveillance camera 35, and the mobile phone 10 exchanges multimedia information and control signals with the remote system 30 as shown in FIG. 5. The input and output devices can be connected to an interface 302.

The remote systems 30, including a remote vehicle control system, a remote vehicle alarm starter, a remote vehicle starter, a remote vehicle alarm, a home automation system, a home control system, and a home security system in FIG. 5, may communicate with an ECR data port 92 and a peripheral interface 94 of the vehicle 90.

To control the remote vehicle control system 30, call up the graphic icons 72 in FIG. 3 by choosing the graphic icon 72 in FIG. 2 for the remote vehicle control system 30. The chosen graphic icon initiate the processing unit 13 to transmits an appropriate command to the remote vehicle control system 30 through the mobile communication modem 33 and the antenna 34, and then the remote vehicle control system 30 executes the command through the ECR data port 92 and the peripheral interface 94.

The diagnosis checks includes checking the status and error checks of the remote systems 30 and checking the status and error of the vehicle 90 including tire pressure, oil gauge, and battery charging level in addition to all the status information from the ECR data port 92 and from the peripheral interface 94.

The mobile phone 10 downloads an electronic map 114 from the server 40 and a global positioning system information through a GPS receiver 308, and the mobile phone 10 is adapted to work as a navigation system with a user of the mobile phone 10 on board of the vehicle 90, where the mobile phone 10 is adapted to work as a tracking system for the vehicle 90 with the user of the mobile phone 10 away from the vehicle 90.

The mobile phone 10 further includes one or more programmable hot keys 19 for shortening a long combination of keys for a predetermined command as shown in FIG. 2.

The remote control system 100 may further include a billing system for using the mobile communication system 20 and the server 40, and the billing system is combined with a billing system of the mobile communication system 20.

The control software programs are downloaded and installed on the mobile phone 10 through the mobile communication system 20.

The mobile phone 10 further includes a power and data connector 18, and the control software programs are downloaded and installed on the mobile phone 10 through the Internet with the power and data connector 18 of the mobile phone 10 as shown in FIG. 2.

The remote systems initiate a connection with the mobile phone 10. The remote systems 30 include a surveillance camera 35, one or more alarm system (not shown), and one or more sensors (not shown). The remote system 30 initiates communications with the mobile phone 10 and issue a warning message, a warning light, a warning sound, or video clips from the remote systems 30 on the display 17, the speaker 120, and the microphone 122 of the mobile phone 10. For example, when a sensor checking the tire pressure senses a tire pressure below a predetermined value, the sensor issues a warning signal to the control software programs to issue appropriate warning message, warning light, warning sound, or video clips.

The remote systems 30 include an audio video recorder (not shown), wherein the mobile phone 10 initiates communication with the remote systems 30 to play an audio video information recorded in the audio video recorder.

Figure 6:
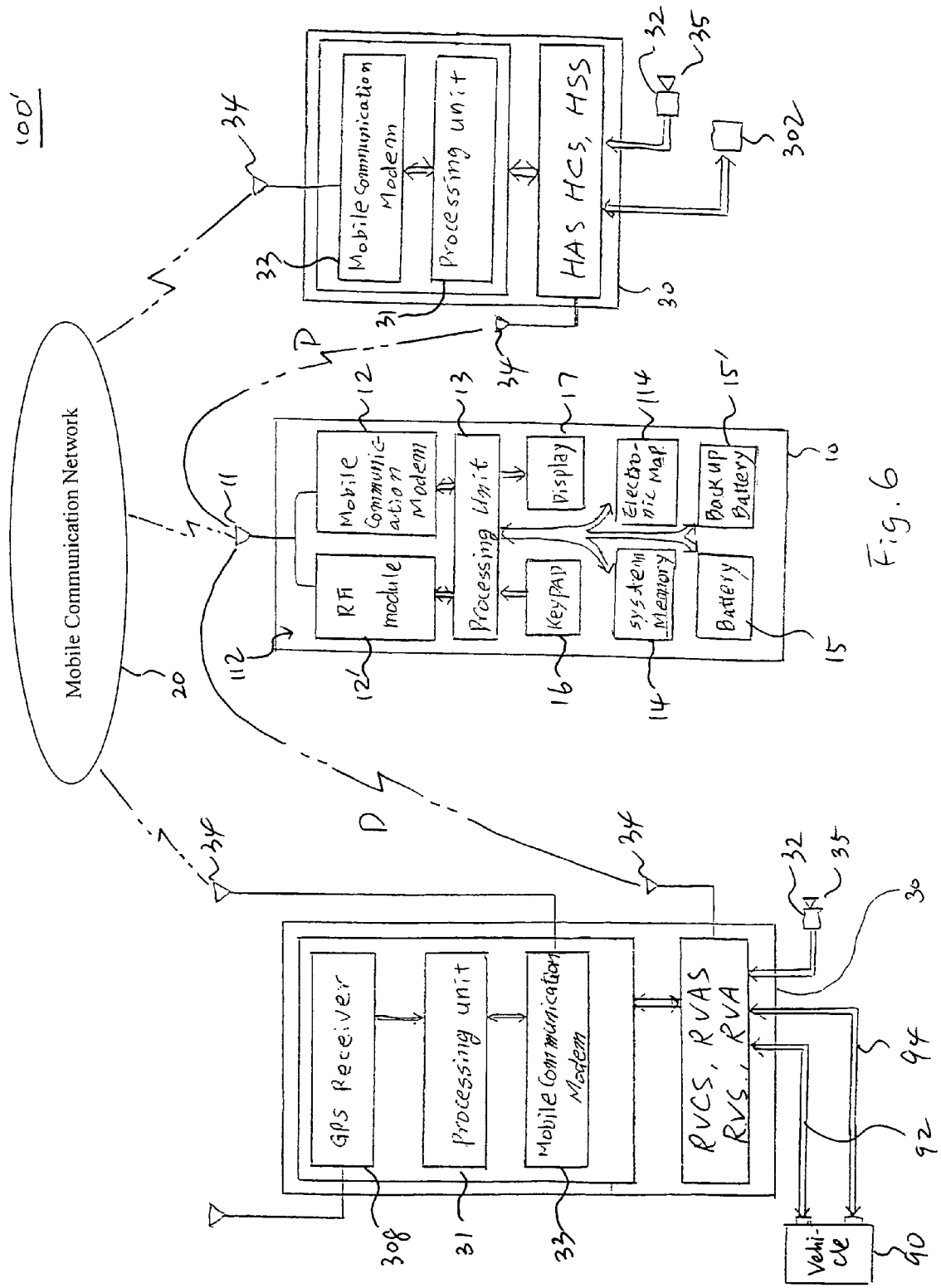
FIG. 6 is a perspective view of a second embodiment of a remote control system.
Figure 7:
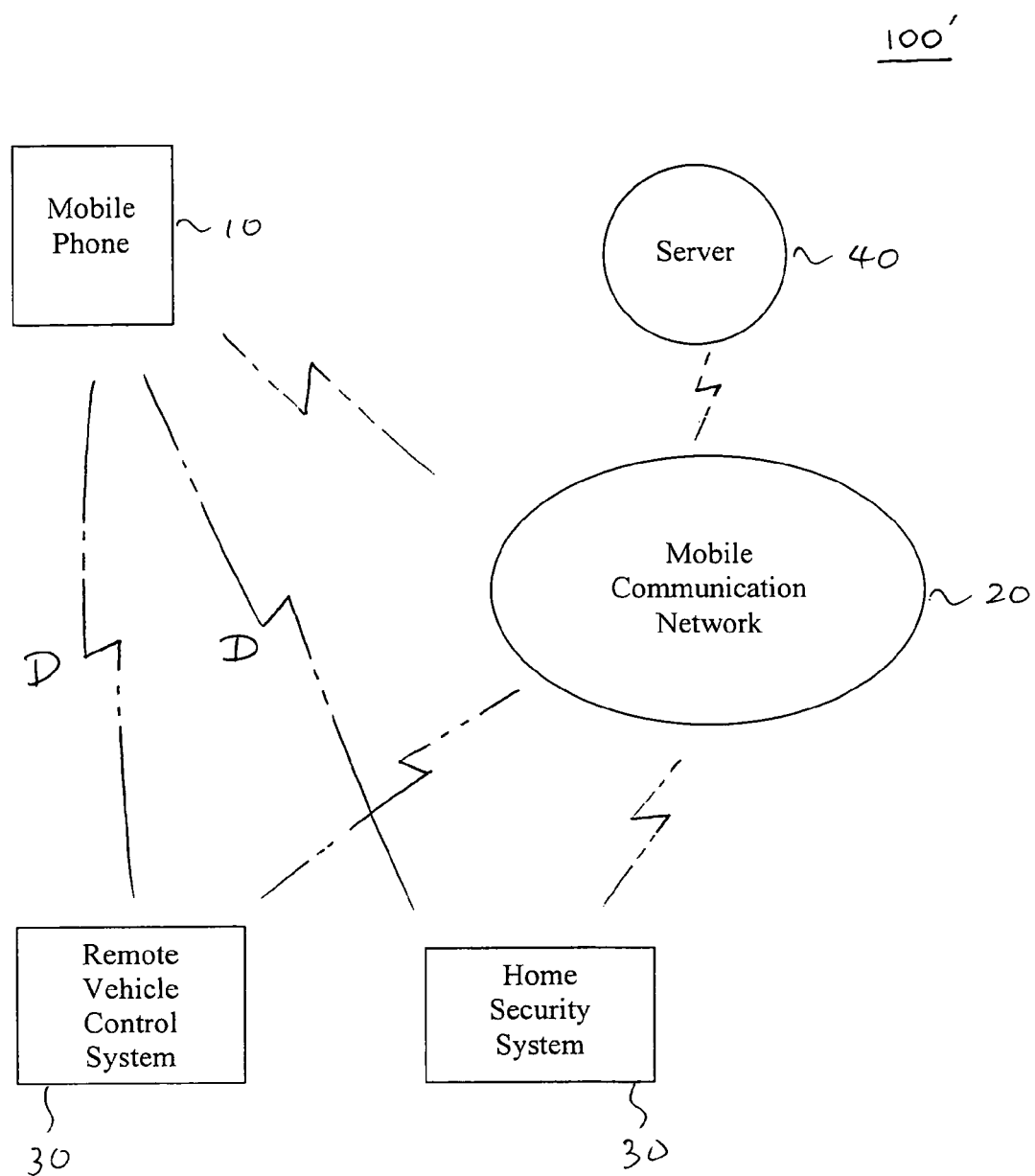
FIG. 7 is a schematic diagram of FIG. 6.

In a second embodiment of the invention as shown in FIG. 6 and FIG. 7, a remote control system 100' may include a mobile phone 10 with an RF communication unit 112 and a back-up battery 15'.

The mobile phone 10 communicates with the remote systems directly (D) through the RF communication unit 112 as shown in FIG. 6 and FIG. 7. The mobile phone 10 further includes a mode button (not shown) for toggle switching between RF mode and MCN (mobile communication network) mode, and the mobile phone 10 further includes a key combination for emulating the mode button. The back-up battery 15' powers the RF communication unit 112 as shown in FIG. 6.

The back-up battery 15' powers the RF communication unit 112 only when the main mobile phone battery 15 is discharged or fails. Also, the back-up battery 15' is charged whenever the mobile phone 10 is charged.

The RF communication unit 112 may use an original RF module in the mobile communication modem 12 of the mobile phone 10, and the mobile communication modem 12 further include a frequency changer for changing the frequency of the original RF module.

Alternatively, the RF communication unit 112 includes a customized RF module 12' of its own as shown in FIG. 6.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A remote control system comprising:
   a mobile phone having an antenna, a mobile communication modem, a processing unit, a system memory, a battery, a keypad, a microphone, a speaker, and a display; and
   a plurality of remote systems communicating electronic signals with the mobile phone directly through an RF communication unit,
   wherein the mobile phone controls a behavior of the plurality of remote systems and communicates electronic signals for data, audio, and video with the processing unit having control software programs, wherein the mobile phone decodes the electronic signals and plays on the display,
   wherein the remote systems are selected using graphic icons, command words, or graphic icons and command words on the display and key combinations on the keypad,
   wherein the mobile phone downloads an electronic map and a global positioning system information through a GPS receiver provided in the remote system, wherein the mobile phone is configured to work as a navigation system with a user of the mobile phone on board of a vehicle, wherein the mobile phone is configured to work as a tracking system for the vehicle with the user of the mobile phone away from the vehicle,
   wherein the mobile phone further comprises a programmable hot key for shortening a long combination of keys for a predetermined command,
   wherein the mobile phone further comprises a mode button for toggle switching between RF mode and mobile phone mode, wherein the mobile phone further comprises a key combination for emulating the mode button, wherein the back-up battery powers the RF communication unit, and
   wherein the remote systems comprise a remote vehicle control system, a remote vehicle alarm starter, a remote vehicle starter, a remote vehicle alarm, a home automation system, and a home security system
   wherein the behavior of the remote system comprises locking, unlocking, arming, disarming, opening trunk, engine starting, engine disabling, surveillance camera starting, panic mode starting, opening or closing of window, seat memory controlling, and opening or closing of sunroof of the vehicle, wherein the behavior of the remote system comprises behaviors of gate, garages, doors, lights, surveillance cameras, gas valves, and ovens, wherein the behavior of the remote system further comprises arming and disarming of the home security system and controlling of one or more sensors installed on the home security system, and wherein the control software programs perform a plurality of diagnosis checks and error checks, wherein the diagnosis checks includes checking the status and error checks of the remote systems and checking the status and error of the vehicle including tire pressure, oil gauge, and battery charging level in addition to all the status information from a data port and from the peripheral interface.

2. The remote control system of claim 1, wherein the control software programs controls a plurality of behaviors of the remote system and the mobile phone.

3. The remote control system of claim 1, wherein the control software programs monitor a plurality of statuses of the remote system.

4. The remote control system of claim 1, wherein the control software programs perform a plurality of program updates, wherein the program updates comprise updating the feature programs, the firmware, and the control software programs by a user-initiated downloading.

5. The remote control system of claim 1, wherein the remote system comprises an information processing unit, a memory, one or more data taking devices, one or more input devices, and one or more output devices.

6. The remote control system of claim 5, wherein the data taking devices of the remote system comprises a surveillance camera, wherein the mobile phone exchanges multimedia information and control signals with the remote system.

7. The remote control system of claim 1, further comprising a mobile communication system, a server connected to the mobile communication network, and a billing system for using the mobile communication system and the server, wherein the billing system is combined with a billing system of the mobile communication system.

8. The remote control system of claim 1, wherein the control software programs are downloaded and installed on the mobile phone through a mobile communication system.

9. The remote control system of claim 1, wherein the mobile phone further comprises a power and data connector, wherein the control software programs are downloaded and installed on the mobile phone through the Internet with the power and data connector of the mobile phone.

10. The remote control system of claim 1, wherein the remote systems initiate a connection with the mobile phone.

11. The remote control system of claim 10, wherein the remote systems comprise a surveillance camera, one or more alarm system, and one or more sensors, wherein the remote system initiates communications with the mobile phone and display a warning message, a warning light, a warning sound or video clips from the remote systems on the display and the speaker of the mobile phone.

12. The remote control system of claim 10, wherein the remote systems comprise an audio video recorder, wherein the mobile phone initiates communication with the remote systems to play a multimedia information recorded in the audio video recorder.

13. A remote control system comprising:
a mobile phone having an antenna, an RF communication unit, a mobile communication modem, a processing unit, a system memory, an electronic map, a battery, a back-up battery, a keypad, and a display; and a plurality of remote systems communicating electronic signals with the mobile phone directly through the RP communication unit, wherein the mobile phone controls a behavior of the plurality of remote systems and communicates electronic signals for data, audio, and video with the processing unit having control software programs, wherein the mobile phone decodes the electronic signals and plays on the display, wherein the mobile phone further comprises a mode button for toggle switching between RF mode and mobile phone mode, wherein the mobile phone further comprises a key combination for emulating the mode button, wherein the back-up battery powers the RF communication unit, wherein the mobile phone downloads an electronic map and a global positioning system information through a GPS receiver provided in the remote system, wherein the mobile phone is configured to work as a navigation system with a user of the mobile phone on board of a vehicle, wherein the mobile phone is configured to work as a tracking system for the vehicle with the user of the mobile phone away from the vehicle, wherein the mobile phone further comprises a programmable hot key for shortening a long combination of keys for a predetermined command, wherein the remote systems comprise a remote vehicle control system, a remote vehicle alarm starter, a remote vehicle starter, a remote vehicle alarm, a home automation system, a home control system, and a home security system, wherein the remote systems are selected using graphic icons, command words, or graphic icons and command words on the display and key combinations on the keypad, wherein the control software programs controls a plurality of behaviors of the remote system, wherein the behaviors of the remote system comprise locking, unlocking, arming, disarming, opening trunk, engine starting, engine disabling, surveillance camera starting, panic mode starting, opening or closing of window, seat memory controlling, and opening or closing of sunroof of the vehicle, wherein the behavior of the remote system comprises behaviors of gate, garages, doors, lights, surveillance cameras, gas valves, and ovens, wherein the behavior of the remote system further comprises arming and disarming of the home security system, the home automation system, or the home control system.

14. The remote control system of claim 13, wherein the control software programs monitor a plurality of statuses of the remote system, wherein the control software programs perform a plurality of diagnosis checks and error checks, wherein the diagnosis checks includes checking the status and error checks of the remote systems and checking the status and error of the vehicle including tire pressure, oil gauge, and battery charging level in addition to all the status information from a data port and from the peripheral interface, wherein the control software programs perform a plurality of program updates, wherein the program updates comprise updating the feature programs, the firmware, and the control software programs by a user-initiated downloading and updating the feature programs, and the firmware, wherein the remote system comprises an information processing unit, a memory, one or more data taking devices, one or more input devices, and one or more output devices, wherein the data taking devices of the remote system comprises a surveillance camera, wherein the mobile phone exchanges multimedia information and control signals with the remote system.

15. The remote control system of claim 13, wherein the control software programs are downloaded and installed on the mobile phone through a mobile communication system, wherein the mobile phone further comprises a power and data connector, wherein the control software programs are downloaded and installed on the mobile phone through the Internet with the power and data connector of the mobile phone, wherein the remote systems initiate a connection with the mobile phone, wherein the remote systems comprise a surveillance camera, one or more alarm system, and one or more sensors, wherein the remote system initiates communications with the mobile phone and display a warning message, a warning light, a warning sound, or video clips from the remote systems on the display of the mobile phone, wherein the remote systems further comprise an audio video recorder, wherein the mobile phone initiates communication with the remote systems to play a multimedia information recorded in the audio video recorder.

16. The remote control system of claim 13, wherein the RF communication unit uses an original RF module in the mobile communication modem of the mobile phone.

17. The remote control system of claim 16, wherein the mobile communication modem further comprise a frequency changer for changing the frequency of the original RF module.

18. The remote control system of claim 13, further comprising a mobile communication network, and the plurality of remote systems communicating electronic signals with the mobile phone via the mobile communication network.

19. The remote control system of claim 18, further comprising a server connected to the mobile communication network, wherein the remote mobile phone downloads and installs the control software programs from the server through the mobile communication network.

20. The remote control system of claim 18, wherein the mobile phone further comprises a mode button for toggle switching between RF mode and mobile communication network mode.

21. The remote control system of claim 18, wherein the program updates comprise updating the feature programs, and the firmware.

22. The remote control system of claim 18, further comprising a billing system for using the mobile communication system and the server, wherein the billing system is combined with a billing system of the mobile communication system.

* * * * *